United States Patent
Draeger

(10) Patent No.: US 7,986,058 B2
(45) Date of Patent: Jul. 26, 2011

(54) METHOD FOR OPERATING A DEVICE WITH REDUNDANT POWER SUPPLY UNITS AND A POWER SUPPLY APPARATUS WITH REDUNDANT POWER SUPPLY UNITS

(75) Inventor: Markus Draeger, Starnberg (DE)

(73) Assignee: Fujitsu Siemens Computers GmbH, Munich (DE)

( * ) Notice: Subject to any disclaimer, the term of this patent is extended or adjusted under 35 U.S.C. 154(b) by 170 days.

(21) Appl. No.: 12/390,089

(22) Filed: Feb. 20, 2009

(65) Prior Publication Data
US 2009/0206669 A1    Aug. 20, 2009

(30) Foreign Application Priority Data

Feb. 20, 2008  (DE) .......................... 10 2008 010 043

(51) Int. Cl.
*H02J 9/00*          (2006.01)
(52) U.S. Cl. ........................................................ 307/64
(58) Field of Classification Search .............. 307/64–68
See application file for complete search history.

(56) References Cited

U.S. PATENT DOCUMENTS

| | | | | |
|---|---|---|---|---|
| 4,065,676 A | * | 12/1977 | Elias | 307/66 |
| 5,612,580 A | * | 3/1997 | Janonis et al. | 307/64 |
| 5,739,596 A | * | 4/1998 | Takizawa et al. | 307/66 |
| 7,567,060 B1 | * | 7/2009 | Atcitty et al. | 320/116 |

FOREIGN PATENT DOCUMENTS

DE          34 42 374 A1    5/1986

\* cited by examiner

*Primary Examiner* — Albert W Paladini
(74) *Attorney, Agent, or Firm* — Slater & Matsil, L.L.P.

(57) ABSTRACT

A method for the alternating operation of power supply units for a device which has at least two power supply units is disclosed. An alternating operation of the at least two power supply units is supplied by a switchover between the two power supply units if the two power supply units are functional. With alternating operation, the power supply unit that is in operation contributes to the power supply for the device, whereas the power supply unit that is not in operation, is cut off from supplying power to the device. In the case of a failure of the power supply unit which is in operation at the moment, an immediate switchover between the at least two power supply units is provided for.

16 Claims, 2 Drawing Sheets

METHOD FOR OPERATING A DEVICE WITH REDUNDANT POWER SUPPLY UNITS AND A POWER SUPPLY APPARATUS WITH REDUNDANT POWER SUPPLY UNITS

This application claims priority to German Patent Application 10 2008 010 043.9, which was filed Feb. 20, 2008 and is incorporated herein by reference.

TECHNICAL FIELD

Embodiments of the invention relate to a method for operating a device with redundant power supply units and a power supply apparatus with redundant power supply units.

BACKGROUND

With many devices, such as computers, redundant power supplies are provided. A redundant supply is understood to mean the presence of two functionally similar or comparable power supply units that are not simultaneously needed in the normal case. The redundant power supply is designed so that even in the case of a breakdown of one of the two power supply units, an interruption-free operation of the device can be guaranteed.

The power supply units are frequently designed so that an individual power supply unit can provide the peak electrical load of the system.

The result is that with a simultaneous operation, the two power supply units are operated with an individual output of a maximum 50%. Since power supply units, however, have a specific efficiency, which usually declines with an increasingly smaller electronic load, this mode of operation is very unfavorable for the energy consumption of the overall system.

This low efficiency can be avoided by having one of the two power supply units completely turned off during operation of the second power supply unit, that is, keeping one in the so-called "cold stand-by" mode. With a failure of the power supply unit in operation, one must switch over to the replacement power supply unit quickly enough to ensure uninterrupted operation. For this purpose, there must be a suitable electronic switch capable of switching, as quickly as possible, between the switched-off power supply unit and the one in operation. This also requires power supply units that are suitable for an operation of this type and provide for rapid switching. The disadvantage of this mode of operation is that the operating times of the two power supply units will be different. This leads to a different ageing as a result of the dissimilar wear of the two power supply units, and thus to an endangerment of the operating safety of the device.

SUMMARY

In one aspect, the invention describes a method for operating a device with at least two power supply units whereby interruption-free operation of the device can be ensured, wherein the energy consumption of the apparatus is kept low and a uniform aging of the at least two power supply units is guaranteed.

In a particular embodiment a method of the type mentioned above ensures the interruption-free operation of a device which has at least two power supply units, by an alternating operation of the at least two power supply units. By alternating the switchover between the at least two power supply units, as long as they are functional, the malfunction-free operation of the system can be guaranteed. In the alternating operation, the power supply unit in operation contributes to the power supply to the device, whereas the power supply unit not in operation is cut off from supplying power to the device. If the power supply unit which is in operation at the time should suddenly fail, an immediate switchover is initiated, in which it is possible to dispense with a checking of the functionality of the power supply unit to be put into operation.

Embodiments thereby utilize a method which, with the planned alternation between the at least two power supply units, provides for a regular checking of the functional readiness of the power supply unit which is not in operation, which counteracts the possible failure of one of the two power supply units due to excessively high wear or aging. After a certain operating time, all power supply units used for the power supply can be successively replaced due to the constant operating alternation and thus, continued smooth operation of the device can be ensured.

In another embodiment of the invention, a switchover between at least two power supply units takes place with each startup operation.

In another embodiment of the invention, a switchover between the at least two power supply units takes place after a certain time has elapsed, which prevents a failure of one of the at least two power supply units as a result of wear due to excessively long operation.

In another embodiment, a power supply apparatus with redundant power supply units is set up for the purpose of carrying out one of the previously described methods.

Other details and developments of the invention are described herein.

BRIEF DESCRIPTION OF THE DRAWINGS

The invention is explained, in more detail, in the following with an embodiment and the aid of the drawings.

The figures in the drawings show the following.

The following list of reference symbols can be used in conjunction with the drawings:

1 Device
2, 3 Power supply unit
4 Switch
5 To the device

DETAILED DESCRIPTION

Figure 1:
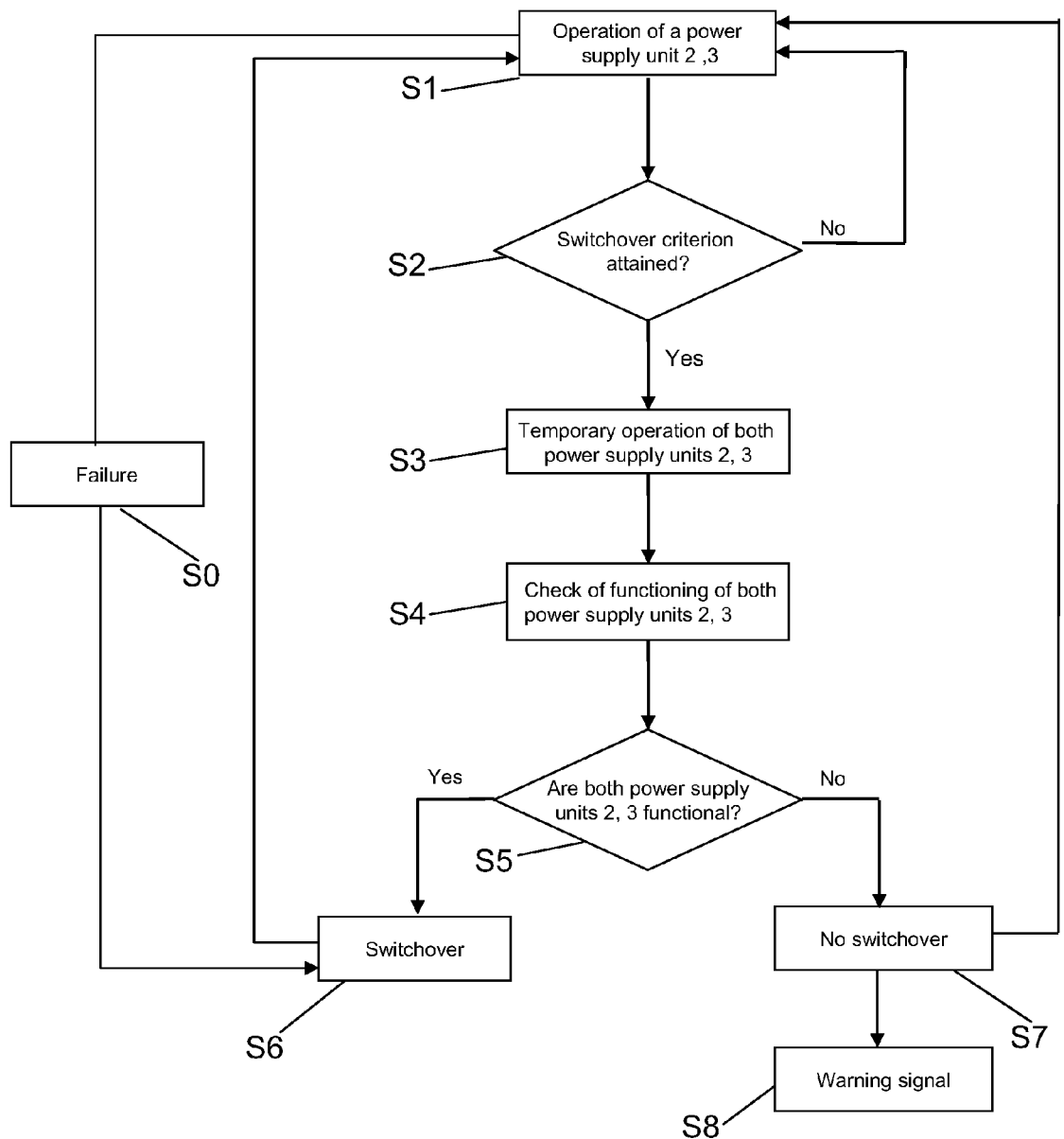
FIG. 1 shows a flow chart for a method for the alternating operation of two power supply units.
Figure 2:
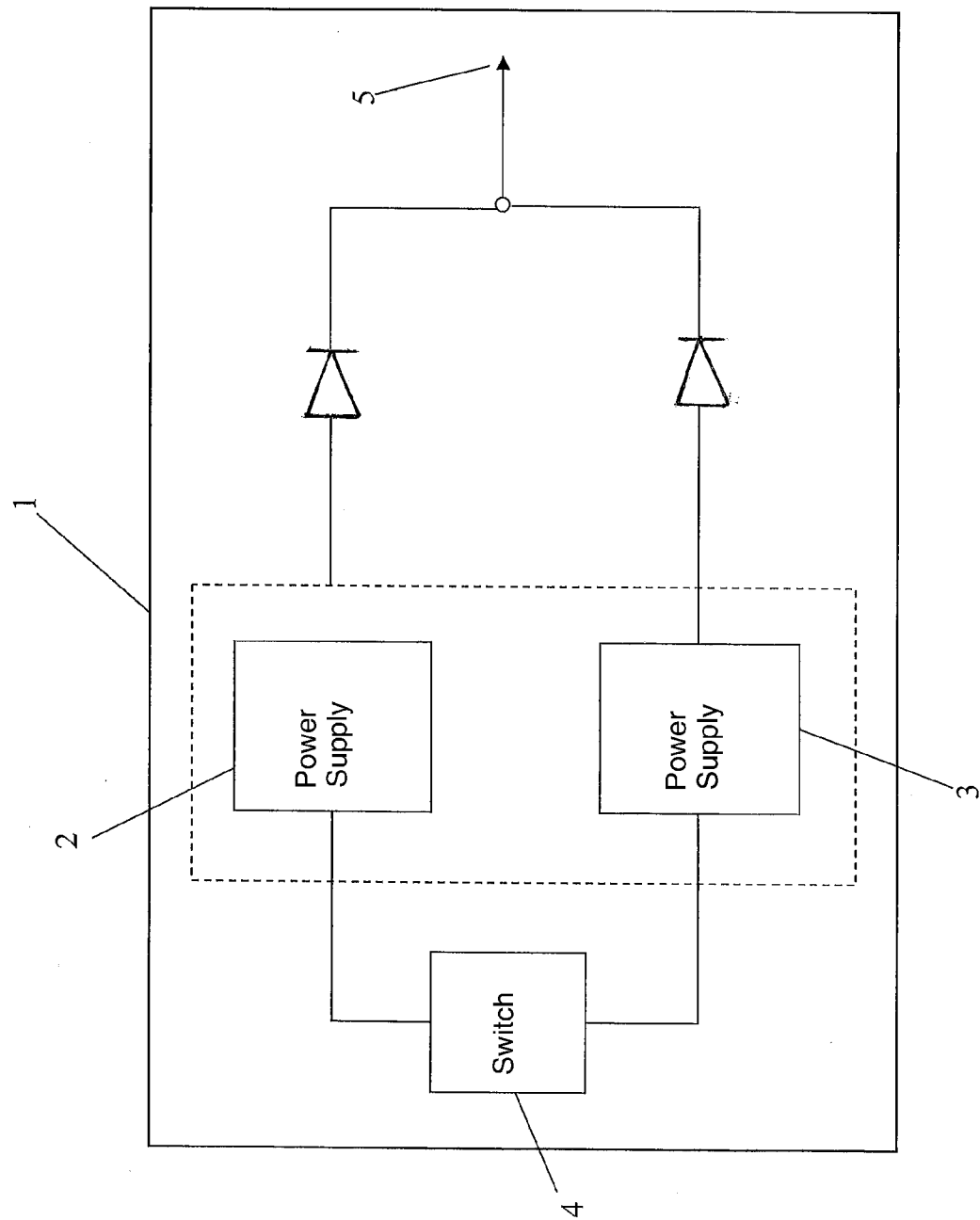
FIG. 2 shows a schematic representation of a device with a redundant power supply from two power supply units and an electronic switch.

FIG. 1 shows a flow chart for a method for the alternating operation of two power supply units, wherein the functionality of the power supply units is checked before each switchover. A block diagram of a device 1 with two mains power supplies 2, 3 is shown in FIG. 2.

Proceeding from a device 1 with two power supply units 2, 3, step S1 provides for the operation of one of the two power supply units 2 or 3, while the second one does not contribute to the power supply of device 1.

In step S2, a check is performed to determine whether a criterion for the switchover between the two power supply units 2, 3 is met. Possible switchover criteria here are switching device 1 at start-up, or reaching a certain temperature or operating time of the power supply unit 2 or 3 in operation.

If one of the provided-for switchover criteria is met, the operation of the two power supply units 2, 3 is provided, for a short time, in step S3, to ensure that both power supply units 2, 3 function properly.

Subsequently, step S4 provides for testing the two power supply units 2, 3. This can be done, for example, by measuring an output voltage of the power supply units 2, 3.

In step S5, a query is made as to whether both power supply units 2, 3 are functional.

If the functionality of the two power supply units 2, 3 is ensured, step S6 provides for the switchover between the two power supply units 2, 3. If the query in step S5 is answered negatively and the second power supply unit 2 or 3, which was not previously in operation, is not functional, then a switchover between the two power supply units 2, 3 does not take place, which is given by step S7. In this case, exclusive operation of the power supply unit 2 or 3 that was previously in operation is provided for. The defective second power supply unit 2 or 3 is again separated from its voltage supply, and can be repaired or replaced. Thus, an interruption-free operation of the apparatus can be ensured.

In addition, in case of the functional incapacity of one of the two power supply units 2, 3, issuance of a warning signal is provided for, as is shown in step S8.

This procedure guarantees that the functionality of the power supply units 2, 3 can remain easy to check.

If the currently operating power supply unit 2, 3 fails suddenly (as shown in step S0), then a switchover between the two power supply units 2, 3 takes place immediately with the omission of steps S2-S5, as shown in step S6. Immediately here means that the switchover is undertaken as rapidly as possible, preferably so rapidly that the power supply of device 1 is not impaired, and interruption-free operation continues. In this case, one dispenses completely with both the short-term parallel operation of the power supply units 2, 3 (step S3) and the function check in step S5 of the power supply unit 2 or 3 to be put in operation, so as to ensure the interruption-free operation of the system. The failed power supply unit 2 or 3 can be subsequently replaced or repaired, after which the alternating operation of the two power supply units 2, 3 can again be started up.

An arrangement that includes a device 1 that has a redundant power supply apparatus from two power supply units 2, 3 is shown in FIG. 2. The redundant supply is indicated in the Figure by the broken-line box around the two power supply units 2, 3. An electronic switch 4 is provided to enable switching between the two power supply units 2, 3.

The device 1, can be a computer system, such as an ordinary personal computer (PC) or a server, as an example. The device 1 can alternately be a medical device or a other device that desires a high availability. As a redundant power supply apparatus, it is possible to provide not just two but rather several power supply units 2, 3. Likewise, two power supply units can be used in a single housing, in which all essential components are doubled.

Switch 4 is provided for switching between the power supply units 2, 3 and to ensure an alternating operation of the power supply units 2, 3. Switch 4 also makes possible a short-term parallel operation of the power supply units 2, 3, to enable testing the functionality of both power supply units 2, 3. Moreover, switch 4 is preferably set up for the purpose of isolating the power supply unit 2 or 3 that is not currently in operation from its voltage supply so that no power is consumed.

A triac arrangement consisting of thyristors, for example, is possible for the electronic switch 4 provided for switching between the at least two power supply units 2, 3.

A possible implementation of the switch 4 would also be, however, an arrangement of transistors as the switching element.

An electromechanical apparatus with a relay as the switching element is another possibility.

Checking the functionality of the power supply units 2, 3 can be performed by measurement of an output voltage, which is compared with a prespecified reference value.

As indicated in FIG. 2, diodes can be used to prevent the power supply units 2, 3 from short-circuiting each other.

The switchover between the at least two power supply units 2, 3 can take place according to various criteria, such as with each startup operation of the device 1, or after a certain operation time of the power supply unit 2 or 3 has elapsed. Certain operating conditions of the two power supply units 2, 3 can also be provided as the switchover criterion, such as the reaching of a certain temperature in the power supply unit 2 or 3 in operation. The temperature can be determined with the aid of measurement sensors (not shown). Other possible operating conditions would involve falling below a predetermined minimum fan speed, or the voltage stability of the power supply unit 2 or 3 in operation at the moment. Monitoring the temperature and the fan speed of the power supply units 2, 3 serves, for example, to recognize a possible overheating of the power supply units 2, 3 and thus their potential premature breakdown, and enable taking timely countermeasures (such as an immediate switchover between the two power supply units 2, 3 and a subsequent replacement of the affected fan or power supply unit 2, 3).

The respective switchover criteria are not mutually exclusive. A combination of various criteria, such as a switchover after a certain operation time has elapsed and even with each boot routine, as could be used, for example, in the operation of servers, is thus also conceivable.

Also, a switchover of the operation that is necessary for maintenance and repair purposes, for example, by manual actuation of a control button that can be provided in switch 4, or by a programming of switch 4 effected via an interface, is guaranteed at any time.

The regular switchover between the at least two power supply units 2, 3 guarantees the same operating duration for the power supply units 2, 3, wherein their uniform usage and wear are achieved and thus the reliability of device 1 is guaranteed.

By operating only one of the at least two power supply units 2, 3 at a time, a good utilization of the power supply unit 2 or 3 in operation can also be ensured, and thus the energy consumption of device 1 can be lowered.

What is claimed is:

1. A method of operating an electronic apparatus that includes first and second power supply units, the method comprising:
    providing power to the electronic apparatus from the first power supply unit connected to a voltage supply while the second power supply unit is cut off from the voltage supply;
    upon meeting a switching criterion, providing power to the electronic apparatus from both the first and second power supply units by connecting both power supply units in parallel to the voltage supply;
    verifying operability of the second power supply unit while the power is being provided from both the first and second power supply units; and
    after verifying operability of the second power supply, providing power to the electronic apparatus from the second power supply unit while the first power supply unit is cut off from the voltage supply.

2. The method of claim 1, further comprising switching between the first and second power supply units upon determining that the power supply unit providing power to the electronic apparatus is not operating properly.

3. The method of claim 2, wherein switching between the power supply units comprises immediately switching between the first and second power supply units.

4. The method of claim 2, further comprising providing a warning indication upon determining that the power supply unit providing power to the electronic apparatus is not operating properly.

5. The method of claim 1, wherein verifying operability of the second power supply unit comprises monitoring an output voltage.

6. The method of claim 1, wherein the switching criterion comprises a new startup operation of the electronic apparatus.

7. The method of claim 1, wherein the switching criterion comprises an elapse of a selected duration of time.

8. The method of claim 1, wherein the electronic apparatus comprises a computer system.

9. A power supply apparatus for supplying power to a device, wherein the power supply apparatus comprises:
at least two mains power supply units, the at least two mains power supply units being configured to supply power to the device from a supply power; and
a switch configured to switch over between the at least two mains power supply units and to ensure an alternating operation of the at least two mains power supply units, wherein the switch is configured to selectively isolate each one of the at least two mains power supply units from the supply power so that no power is consumed by the respective mains power supply unit if the respective mains power supply unit is currently not in operation; wherein the switch is further configured to enable a short-term parallel operation of the at least two mains power supply units for testing of the functionality of the at least two supply units; and wherein the switch is further configured to implement a switchover between the at least two mains power supply units according to a criterion comprising at least one of a startup operation of the device, and a certain operation time of the mains power supply unit.

10. The power supply apparatus according to claim 9, wherein the switch makes possible a manual switching between the at least two mains power supply units.

11. A method for operating a device by means of at least two mains power supply units, the method comprising:
providing electrical power for the operation of the device by a first one of the two mains power supply units connected to a voltage supply, while a second one of the two mains power supply units is isolated from the voltage supply, so that it does not contribute to the electrical power provided for the operation of the device;
performing a check to determine whether a criterion for a switchover between the two mains power supply units is met, wherein the criterion comprises at least one of detection of a start-up of the device, reaching a predetermined temperature of the first mains power supply unit, and reaching a predetermined operating time of the first mains power supply unit;
if the criterion for the switchover is met, operating of the two mains power supply units in parallel by connecting both mains power supply units to the voltage supply, and, during the parallel operation, testing the two mains power supply units to ensure that both mains power supply units function properly; and
if, according to the testing, the functionality of the two mains power supply units is ensured, performing a switchover operation from the first mains power supply unit to the second mains power supply unit by isolating the first mains power supply unit from the voltage supply, otherwise, not performing the switchover operation such that the first mains power supply unit remains connected to the voltage supply and isolating the second mains power supply unit from the voltage supply.

12. The method according to claim 11, further comprising: detecting a failure of the first or the second mains power supply unit while the respective mains power supply unit is operational and performing a switchover between the respective mains power supply unit and the other mains power supply unit, by immediately connecting the other mains power supply unit to the voltage supply and disconnecting the respective power supply without a parallel operation of the two mains power supply units and testing of the other mains power supply unit.

13. The method according to claim 11, wherein the step of testing of the two mains power supply units comprises measuring an output voltage of the mains power supply units.

14. The method according to claim 11, wherein the criterion for the switchover further comprises at least one of the mains power supply units falling below a predetermined minimum fan speed of the first mains power supply unit, and falling below a predetermined voltage stability of the first mains power supply unit.

15. The method according to claim 11, further comprising indicating a warning signal if, according to the testing, the functionality of one of the at least two mains power supply units is not ensured.

16. The power supply apparatus according to claim 9, wherein the switch contains a triac or a relay as a switching element.

* * * * *